US009446332B2

(12) United States Patent
Shin et al.

(10) Patent No.: US 9,446,332 B2
(45) Date of Patent: Sep. 20, 2016

(54) APPARATUS FOR SEPARATING GAS AND LIQUID

(71) Applicant: LG CHEM, LTD., Seoul (KR)

(72) Inventors: Dae Young Shin, Daejeon (KR); Eun Jung Joo, Daejeon (KR); Dong Kwon Lee, Daejeon (KR); Chang Hoe Heo, Daejeo (KR); Jong Ku Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 14/437,421

(22) PCT Filed: Jul. 18, 2014

(86) PCT No.: PCT/KR2014/006525
§ 371 (c)(1),
(2) Date: Apr. 21, 2015

(87) PCT Pub. No.: WO2015/009093
PCT Pub. Date: Jan. 22, 2015

(65) Prior Publication Data
US 2015/0274546 A1    Oct. 1, 2015

(30) Foreign Application Priority Data
Jul. 18, 2013   (KR) .................. 10-2013-0084551
Jul. 17, 2014   (KR) .................. 10-2014-0090324

(51) Int. Cl.
*B01D 45/00*   (2006.01)
*B01D 19/00*   (2006.01)
(Continued)

(52) U.S. Cl.
CPC ........... *B01D 19/0052* (2013.01); *B01D 45/14* (2013.01); *B01D 46/002* (2013.01);
(Continued)

(58) Field of Classification Search
CPC ........ B01D 45/16; B01D 5/005; B01D 3/30; B01D 3/20; B01D 3/22; B01D 45/14; B01D 45/12; B01D 46/0068; B01D 46/0075; B01D 46/241; A23L 1/2217; A23L 2/64; B04B 2005/125; F01M 2013/0422
USPC .................. 55/400–409, 424–427, 295–305
See application file for complete search history.

(56) References Cited

U.S. PATENT DOCUMENTS 1,503,657 A * 8/1924 McHugh ................. C13B 20/00
                                                         127/27
1,595,066 A * 8/1926 Booth ................ B01D 21/0036
                                                         210/522

(Continued)

FOREIGN PATENT DOCUMENTS

CN    201214025       4/2009
CN    101612486 A    12/2009
(Continued)

Primary Examiner — Dung H Bui
(74) Attorney, Agent, or Firm — Dentons US LLP

(57) ABSTRACT

Disclosed is an apparatus for separating gas and liquid. The apparatus for separating gas and liquid includes a housing, a rotating shaft provided inside the housing, a drive unit configured to rotate the rotating shaft, a rotating cone mounted at the rotating shaft to rotate about the rotating shaft and having a diameter decreasing from an upper end to a lower end thereof, a fixed cone fixed in the housing to be spaced apart from the rotating cone and having a diameter decreasing from an upper end to a lower end thereof, and a scraper configured to remove scale generated in at least one of the fixed cone and the rotating cone, based on the rotation of the rotating shaft.

13 Claims, 13 Drawing Sheets

(51) Int. Cl.
*B01D 46/00* (2006.01)
*B01D 46/24* (2006.01)
*B01J 10/00* (2006.01)
*B01J 19/00* (2006.01)
*B01J 19/18* (2006.01)
*B01D 45/14* (2006.01)

(52) U.S. Cl.
CPC ....... *B01D46/0068* (2013.01); *B01D 46/0075* (2013.01); *B01D 46/2411* (2013.01); *B01J 10/00* (2013.01); *B01J 19/006* (2013.01); *B01J 19/0066* (2013.01); *B01J 19/1887* (2013.01); *B01J 2219/0077* (2013.01); *B01J 2219/00247* (2013.01); *B01J 2219/00779* (2013.01)

(56) References Cited

U.S. PATENT DOCUMENTS

| | | | | |
|---|---|---|---|---|
| 1,602,014 A * | 10/1926 | Graham | ................ | B01D 21/14 209/208 |
| 1,780,655 A * | 11/1930 | Nyrop | ................ | B04B 1/20 494/53 |
| 1,830,516 A * | 11/1931 | Kurie, Jr. | ................ | B01D 21/14 210/367 |
| 2,218,342 A * | 10/1940 | Pegram | ................ | B01D 3/08 159/6.1 |
| 2,228,750 A * | 1/1941 | Brock | ................ | A47L 5/22 417/363 |
| 2,314,986 A * | 3/1943 | Johnson | ................ | A47L 9/181 55/361 |
| 2,606,146 A * | 8/1952 | Luten, Jr. | ................ | B01D 1/223 159/18 |
| 2,633,930 A * | 4/1953 | Carter | ................ | B07B 7/08 209/714 |
| 2,698,287 A * | 12/1954 | Bowden | ................ | B01D 3/30 159/11.3 |
| 2,954,330 A * | 9/1960 | Schmieding | ............. | B01D 3/30 159/6.1 |
| 3,234,716 A * | 2/1966 | Sevin | ................ | B01D 45/14 209/710 |
| 4,108,620 A * | 8/1978 | Bohme | ................ | B01D 59/20 310/67 R |
| 4,339,398 A * | 7/1982 | Feres | ................ | B01J 19/32 261/89 |
| 4,460,393 A * | 7/1984 | Saget | ................ | B01D 45/14 209/714 |
| 4,995,945 A | 2/1991 | Craig | | |
| 5,264,124 A * | 11/1993 | Nemedi | ................ | B04B 3/00 210/373 |
| 6,030,532 A * | 2/2000 | Racine | ................ | B01D 33/11 209/208 |
| 6,514,303 B2* | 2/2003 | Lukac | ................ | A01B 51/026 123/198 E |
| 6,536,211 B1* | 3/2003 | Borgstrom | ............. | B01D 45/14 55/404 |
| 2007/0227357 A1* | 10/2007 | McDermott | ........... | B01D 53/24 95/270 |

FOREIGN PATENT DOCUMENTS

| | | | |
|---|---|---|---|
| DE | 3346078 C1 | 6/1985 | |
| EP | 0191625 A2 | 8/1986 | |
| FR | 2575677 A1 * | 7/1986 | ............. B04B 5/12 |
| JP | 56-168084 A | 12/1981 | |
| JP | 2002-045605 A | 2/2002 | |
| JP | 2005313100 | 11/2005 | |
| KR | 1020100021695 | 2/2010 | |
| KR | 1020120114848 | 10/2012 | |
| KR | 1020120132419 | 12/2012 | |

* cited by examiner

APPARATUS FOR SEPARATING GAS AND LIQUID

This application is a National Stage Application of International Application No. PCT/KR2014/006525, filed Jul. 18, 2014, and claims the benefit of Korean Patent Application No. 10-2013-0084551, filed on Jul. 18, 2013, and Korean Patent Application No. 10-2014-0090324, filed on Jul. 17, 2014, all of which are hereby incorporated by reference in their entirety for all purposes as if fully set forth herein.

TECHNICAL FIELD

The present invention relates to an apparatus for separating gas and liquid, and more particularly, to an apparatus for separating gas and liquid capable of removing scale generated in a fixed cone and a rotating cone.

BACKGROUND ART

Generally, reaction apparatuses are required to prepare products through a chemical reaction. A batch-type reactor in which raw material products are added into, and then stirred in one reactor has been usually used as such reaction apparatuses. However, when the batch-type reactor is used, a large amount of non-raw material products may be generated since a sufficient reaction does not occur on reactions requiring a rapid mass transfer rate. Also, when a catalyst is used, a process of separating the catalyst is essentially required, resulting in an increase in cost in use of a large-scaled batch-type reactor.

Korean Patent No. 10-961,765 discloses a spinning disk reactor. However, the spinning disk reactor has a problem in that a raw material reactant remains in a spinning disk for a short retention time since the disk is disposed in a horizontal direction. Accordingly, a spinning cone column (SCC) capable of improving a retention time of the raw material reactant by installing a disk having a certain slope, that is, a cone, has been proposed.

In the case of the spinning cone column, rotating cones and fixed cones are alternately installed inside one column. However, the spinning cone column has no means capable of removing scale generated in the rotating cones or fixed cones. When such scale grows into lump, the lump may be separated to disturb an operation of the apparatus.

DISCLOSURE

Technical Problem

The present invention is directed to providing an apparatus for separating gas and liquid capable of effectively removing scale generated in a rotating cone or a fixed cone.

Technical Solution

To solve the prior-art problems, one aspect of the present invention provides an apparatus for separating gas and liquid including a housing, a rotating shaft provided inside the housing, a drive unit configured to rotate the rotating shaft, a rotating cone mounted at the rotating shaft to rotate about the rotating shaft and having a diameter decreasing from an upper end to a lower end thereof, a fixed cone fixed in the housing to be spaced apart from the rotating cone and having a diameter decreasing from an upper end to a lower end thereof, and a scraper configured to remove scale generated in at least one of the fixed cone and the rotating cone, based on the rotation of the rotating shaft.

Here, the scraper may be fixed in the rotating shaft or the rotating cone, and configured to remove scale generated in the fixed cone while rotating with the rotating shaft or the rotating cone.

Also, the scraper may extend from the rotating shaft or the rotating cone toward the fixed cone.

In addition, the scraper may be spaced apart at a predetermined distance from the fixed cone.

Additionally, the scraper may extend to face an outer circumferential surface of the fixed cone.

Further, the scraper may extend to face an inner circumferential surface of the fixed cone.

Also, the scraper may extend parallel to the rotating shaft.

In addition, the scraper may extend at a predetermined angle with respect to the rotating shaft.

Meanwhile, the scraper may be fixed in the housing or the fixed cone, and configured to remove scale generated in the rotating cone while the rotating cone is rotated.

Also, the scraper may extend from the housing or the fixed cone toward the rotating cone.

In addition, the scraper may be spaced apart at a predetermined distance from the rotating cone.

Additionally, the scraper may extend to face an outer circumferential surface of the rotating cone.

Further, the scraper may extend to face an inner circumferential surface of the rotating cone.

Also, the scraper may extend parallel to the rotating shaft.

In addition, the scraper may extend at a predetermined angle with respect to the rotating shaft.

Another aspect of the present invention provides an apparatus for separating gas and liquid including a housing, a rotating shaft provided inside the housing, a drive unit configured to rotate the rotating shaft, a rotating cone mounted at the rotating shaft to rotate about the rotating shaft and having diameter decreasing from an upper end to a lower end thereof, a fixed cone fixed in the housing to be spaced apart from the rotating cone and having a diameter decreasing from an upper end to a lower end thereof, a first scraper configured to remove scale generated in the fixed cone, based on the rotation of the rotating shaft, and a second scraper configured to remove scale generated in the rotating cone, based on the rotation of the rotating shaft.

Here, the first scraper may be fixed in the rotating shaft or the rotating cone, and configured to remove scale generated in the fixed cone while rotating with the rotating shaft or the rotating cone.

Also, the first scraper may extend from the rotating shaft or the rotating cone toward the fixed cone, and the first scraper may be spaced apart at a predetermined distance from the fixed cone, based on the thickness of scale to be generated in the fixed cone.

In addition, the second scraper may be fixed in the housing or the fixed cone, and configured to remove scale generated in the rotating cone while the rotating shaft is rotated.

Additionally, the second scraper may extend from the housing or the fixed cone toward the rotating cone, and the second scraper mat be spaced apart at a predetermined distance from the rotating cone, based on the thickness of scale to be generated in the rotating cone.

Advantageous Effects

As described above, the apparatus for separating gas and liquid according to at least one exemplary embodiment of the present invention has the following effects.

Scale generated in at least one of the rotating cone and the fixed cone may be effectively removed by means of the scraper.

Also, the removal of the scale by the scraper is performed based on the rotation of the rotating cone, and thus no separate drive source used to drive the scraper is required.

BEST MODE

Figure 1:
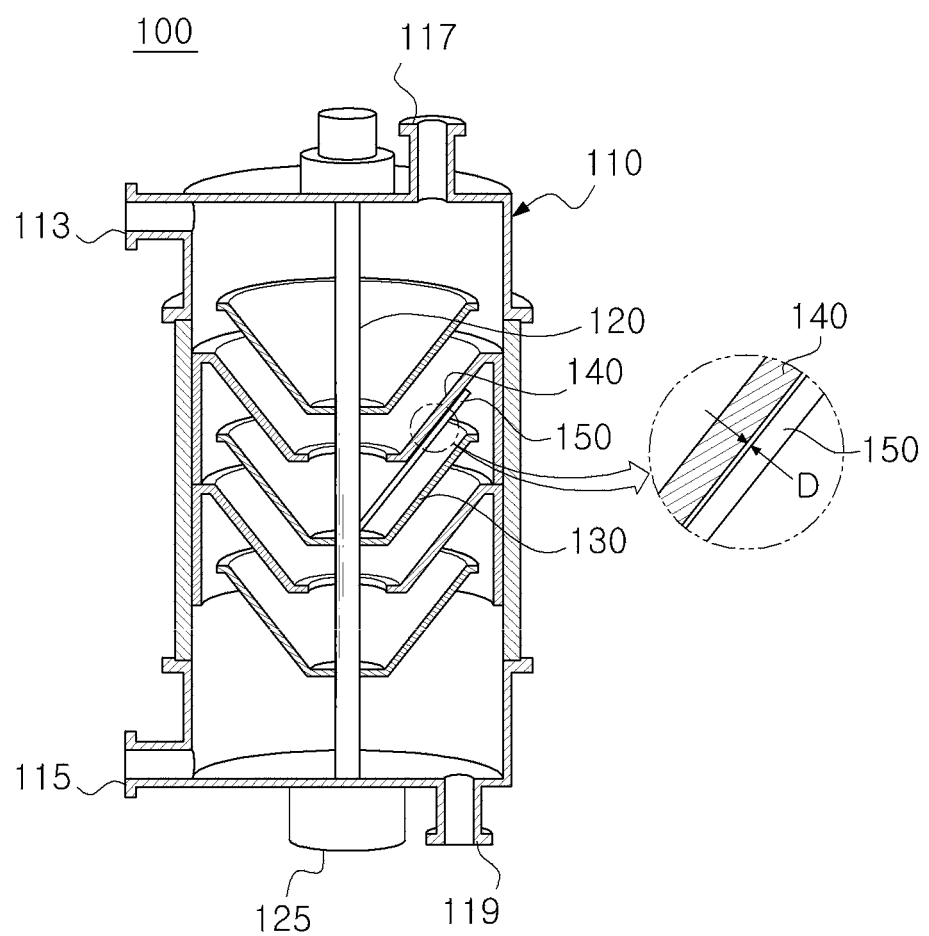
FIGS. 1 to 5 are cross-sectional views of an apparatus for separating gas and liquid according to a first exemplary embodiment of the present invention.

Hereinafter, apparatuses for separating gas and liquid according to various exemplary embodiments of the present invention will be described in detail with reference to the accompanying drawings.

Also, regardless of the reference numerals in the drawings, like or corresponding elements have the same or similar reference numerals, and a description thereof is omitted for clarity. In this case, the shapes and dimensions of elements shown in the drawings may be exaggerated or diminished for the sake of convenience of description.

FIGS. 1 to 5 are cross-sectional views of an apparatus for separating gas and liquid according to a first exemplary embodiment of the present invention.

An apparatus for separating gas and liquid 100 according to the first exemplary embodiment of the present invention includes a housing 110, a rotating shaft 120 provided inside the housing 110, and a drive unit 125 configured to rotate the rotating shaft 120.

Also, the apparatus for separating gas and liquid 100 includes a rotating cone 130 mounted at the rotating shaft 120 to rotate about the rotating shaft 120 and having a diameter decreasing from an upper end to a lower end thereof, and a fixed cone 140 fixed in the housing 110 to be spaced apart from the rotating cone 130 and having a diameter decreasing from an upper end to a lower end thereof.

In addition, the apparatus for separating gas and liquid 100 includes a scraper 150 configured to remove scale generated in at least one of the fixed cone 140 and the rotating cone 130, based on the rotation of the rotating shaft 120.

The housing 110 may be formed as a hollow cylinder (a tubular cylinder) having a space formed therein for accommodating the rotating shaft 120, the rotating cone 130, the fixed cone 140, and the scraper 150. Also, the housing 110 may be a column extending in a height direction. According to one exemplary embodiment, the housing 110 may be formed of stainless steel, but the material of the housing is not necessarily limited thereto.

Also, the housing 110 may include a first supply unit 113 configured to supply a reactant into the housing 110, and a second supply unit 115 configured to supply a gas into the housing 110.

Here, since the reactant moves downward (to a lower end portion of the housing 110 in a height direction) due to the gravity, the first supply unit 113 used to supply the reactant may be provided in an upper end portion (an upper end portion in a height direction) of the housing 110. In this case, the two or more first supply unit 113 may be provided to supply two or more reactants.

Also, since the gas reacts with the reactant while moving in an upper direction opposite to that of the reactant (toward an upper end portion of the housing 110 in a height direction), the second supply unit 115 used to supply a gas may be provided in a lower end portion of the housing 110.

Meanwhile, the housing 110 may include an outlet unit 117 used to discharge a residual gas from the housing 110, and a collection unit 119 used to collect a product from the housing 110.

Here, the residual gas is a gas obtained after reacting with the reactant while moving toward the upper side of the housing 110. Therefore, the outlet unit 117 used to discharge the residual gas may be provided in an upper end portion of the housing 110. Also, the product is generated by reacting with the gas or being subjected to gas treatment as the reactant moves to a lower portion of the housing 110. Therefore, the collection unit 119 used to collect the product may be provided in a lower end portion of the housing 110.

Specifically, the first supply unit 113 and the outlet unit 117 may be provided in the upper end portion of the housing 110, and the second supply unit 115 and the collection unit 119 may be provided in the lower end portion of the housing 110.

However, the positions of the first supply unit 113, the second supply unit 115, the outlet unit 117, and the collection unit 119 are illustratively shown, but the present invention is not necessarily limited thereto. For example, referring to FIG. 1, the first supply unit 113 may be formed in a lateral surface of the upper end portion of the housing 110, and the outlet unit 117 may be formed in a top surface of the housing 110. On the other hand, referring to FIG. 3, the first supply unit 113 may be formed in the top surface of the housing 110, and the outlet unit 117 may be formed in the lateral surface of the upper end portion of the housing 110.

The rotating shaft 120 serves to rotate the rotating cone 130, and is formed inside the housing 110 in a height direction (for example, a vertical direction) of the housing 110.

Here, the rotating shaft 120 is coupled to the drive unit 125 such as a motor, and the drive unit 125 serves to rotate the rotating shaft 120.

Meanwhile, the rotating cone 130 is mounted at the rotating shaft 120 to rotate about the rotating shaft 120. Also, the rotating cone 130 may have a diameter decreasing from an upper end to a lower end thereof, based on the height direction of the housing 110. Specifically, the rotating cone 130 may be formed in a tubular shape in which the rotating cone 130 has a diameter decreasing from the upper end to the lower end thereof.

Also, the fixed cone 140 is fixed in the housing 110 to be spaced apart from the rotating cone 130. Also, the fixed cone 140 may have a diameter decreasing from an upper end to a lower end thereof, based on the height direction of the housing 110. Specifically, the fixed cone 140 may be formed in a tubular shape in which the fixed cone 140 has a diameter decreasing from the upper end to the lower end thereof.

In addition, the scraper serves to remove scale generated in at least one of the fixed cone 140 and the rotating cone 130, based on the rotation of the rotating shaft 120.

The rotating cone 130 and the fixed cone 140 may be alternately disposed in a height direction of the rotating shaft 120. Also, the plurality of rotating cones 130 may be mounted at the rotating shaft 120 at predetermined distances. Also, the plurality of fixed cones 140 may be fixed in the housing 110 at predetermined distances.

Meanwhile, the reactant supplied into the housing 110 moves in an upper end direction of the rotating cone 130 by means of a centrifugal force generated while the rotating cone 130 is rotated, and then is separated from the rotating cone 130, and transferred to the fixed cone 140.

Specifically, the rotating cone 130 has a lower end portion mounted at the rotating shaft 120. Therefore, when the rotating shaft 120 rotates by means of the drive unit 125, the rotating cone 130 may rotate about the rotating shaft 120. Also, the rotating cone 130 may be formed in a tubular shape in which the rotating cone 130 has a diameter decreasing from the upper end to the lower end thereof, and the rotating cone 130 may be generally formed in a "V" shape, as viewed from a vertical section thereof.

When the reactant is introduced into such a rotating cone 130, the reactant spreads along the rotating cone 130 in the form of a thin film by means of a centrifugal force, moves from the upper end thereof, and then is transferred to the fixed cone 140.

Meanwhile, the fixed cone 140 may be formed inside the housing 110, and may be formed in a tubular shape in which the fixed cone 140 has a diameter decreasing from the upper end to the lower end thereof, and the fixed cone 140 may be generally formed in a "V" shape, as viewed from a vertical section thereof.

In this case, the fixed cone 140 may be spaced apart from the rotating cone 130, and may be formed in a shape surrounding the outer circumference of the rotating cone 130. Specifically, the fixed cone 140 may be formed so that the maximum diameter of the fixed cone 140 is higher than that of the rotating cone 130. Therefore, the fixed cone 140 may receive the reactant from the rotating cone 130. Also, the fixed cone 140 and the rotating cone 130 may be alternately provided one by one inside the housing 110.

Figure 6:
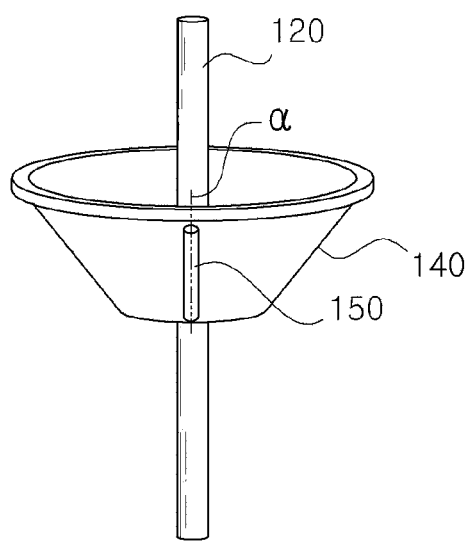
FIGS. 6 and 7 are partial perspective views showing a scraper and a fixed cone which constitute the apparatus for separating gas and liquid according to the first exemplary embodiment of the present invention.
Figure 7:
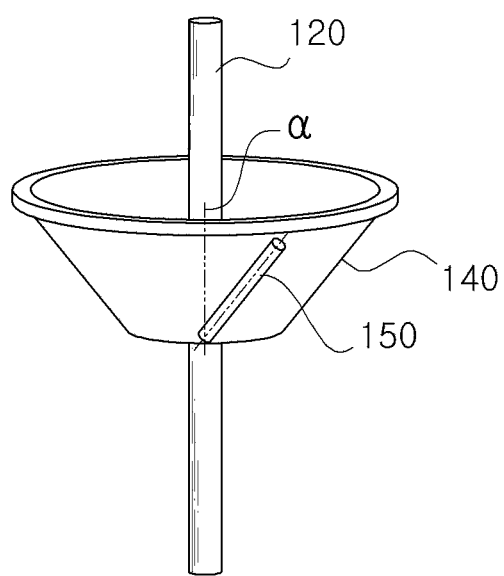
Figure 8:
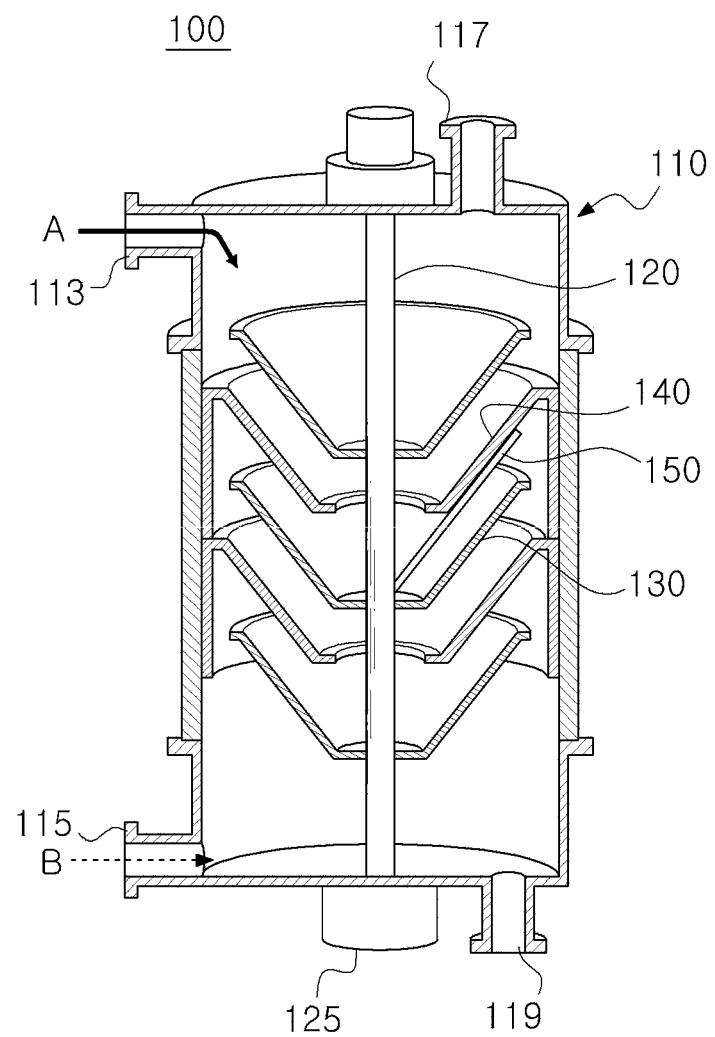
FIGS. 8 and 9 are cross-sectional views showing one operating state of the apparatus for separating gas and liquid according to the first exemplary embodiment of the present invention.
Figure 9:
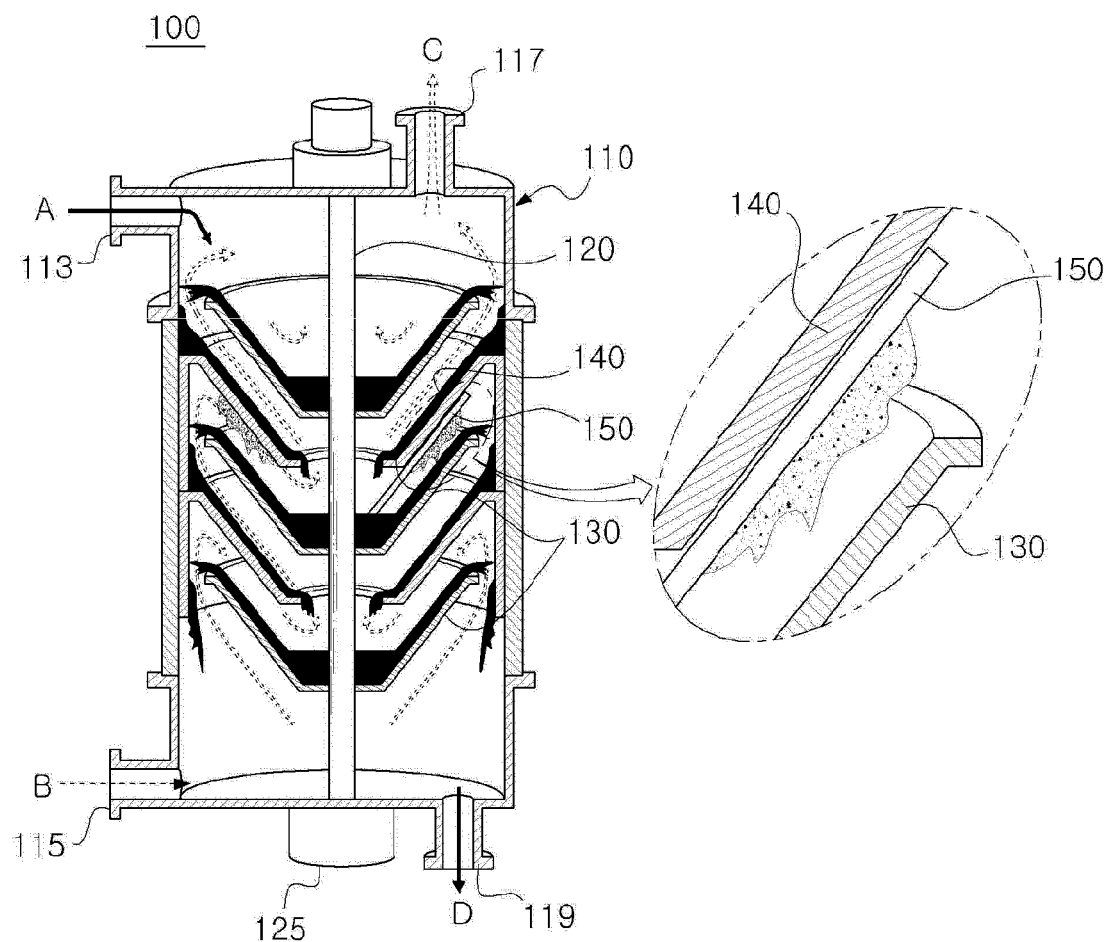

FIGS. 6 and 7 are partial perspective views showing a scraper and a fixed cone which constitute the apparatus for separating gas and liquid according to the first exemplary embodiment of the present invention, and FIGS. 8 and 9 are cross-sectional views showing one operating state of the apparatus for separating gas and liquid according to the first exemplary embodiment of the present invention.

The scraper 150 may serve to remove scale generated in the fixed cone 140. Also, in this specification, the scraper 150 used to remove scale generated in the fixed cone 140 may be referred to as a first scraper. Specifically, the scraper 150 may be fixed in the rotating shaft 120 or the rotating cone 130, and used to remove scale generated in the fixed cone 140 while rotating with the rotating shaft 120 or the rotating cone 130.

Here, the scraper 150 is a bar-shaped scraper extending in a rod shape from the rotating shaft 120 or the rotating cone 130. In this case, the scraper 150 may periodically remove scale generated in the fixed cone 140 while rotating with the rotating shaft 120 or the rotating cone 130 since the scraper 150 extends from the rotating shaft 120 or the rotating cone 130.

Also, the scraper 150 may come in contact with the fixed cone 140 to remove the scale generated in the fixed cone 140. On the other hand, referring to FIG. 1, the scraper 150 may be spaced apart at a predetermined distance D from the fixed cone 140 in order to prevent friction between the scraper 150 and the fixed cone 140. In this case, when the scale is generated in the fixed cone 140 to a thickness 이상 a certain thickness, the scale may be removed by the scraper 150.

In addition, the scraper 150 extends from the rotating shaft 120 or the rotating cone 130 toward the fixed cone 140. Here, the scraper 150 may be spaced apart at a predetermined distance D from the fixed cone 140, based on the thickness of the scale generated in the fixed cone 140. Specifically, a fixed end of the scraper 150 is coupled to the rotating shaft 120 or the rotating cone 130, and a free end of the scraper 150 extends from the fixed end toward the fixed cone 140. Also, the free end of the scraper 150 may be spaced apart at a predetermined distance D from the fixed cone 140.

Additionally, when bubbles are formed on the fixed cone 140, the scraper 150 may burst the bubbles to prevent or inhibit growth of the scale.

Figure 3:
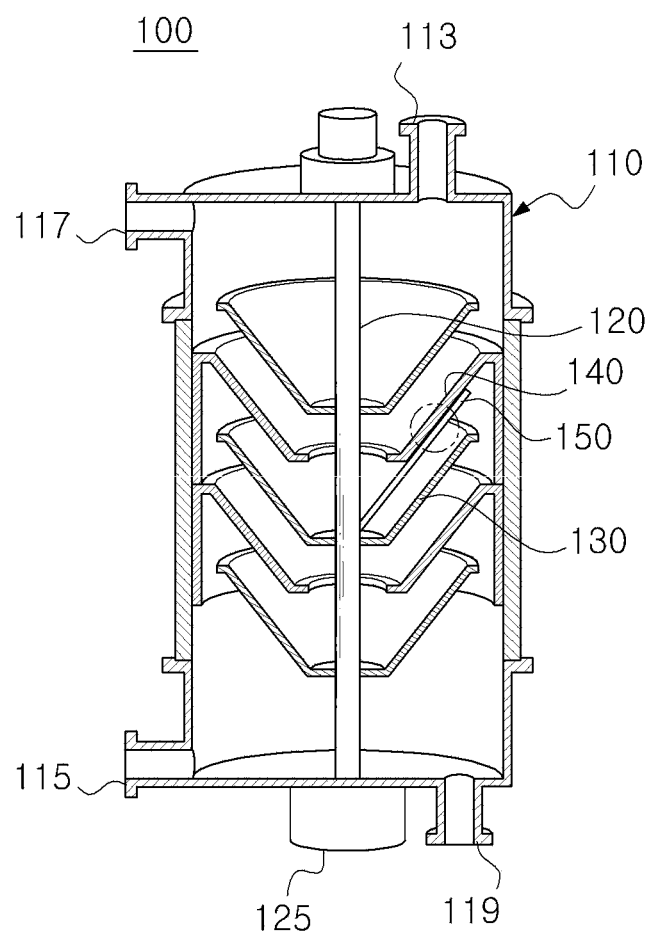
Figure 4:
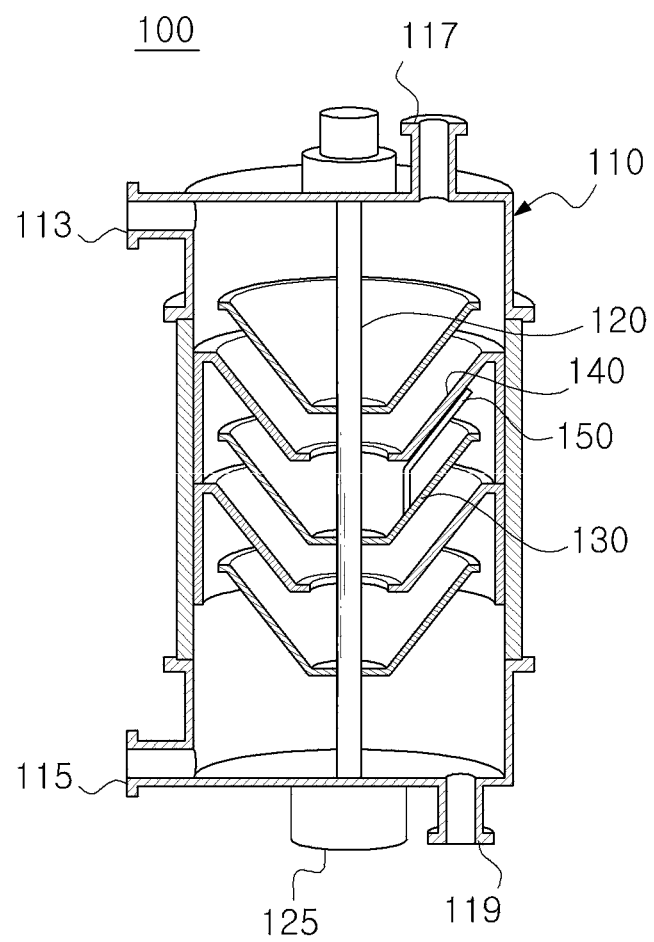

Meanwhile, the position of the scraper 150 is not particularly limited as long as the scraper 150 may remove the scale generated in the fixed cone 140. Referring to FIGS. 1, 3 and 4, however, the scraper 150 may extend to face an outer circumferential surface of the fixed cone 140 in order to remove the scale generated in the outer circumferential surface of the fixed cone 140.

Also, the outer circumferential surface of the fixed cone 140 may refer to a surface facing the housing 110, and an inner circumferential surface of the fixed cone 140 may refer to a surface facing the rotating shaft 120. Similarly, an outer circumferential surface of the rotating cone 130 may refer to a surface facing the housing 110, and an inner circumferential surface of the rotating cone 130 may refer to a surface facing the rotating shaft 120.

Figure 2:
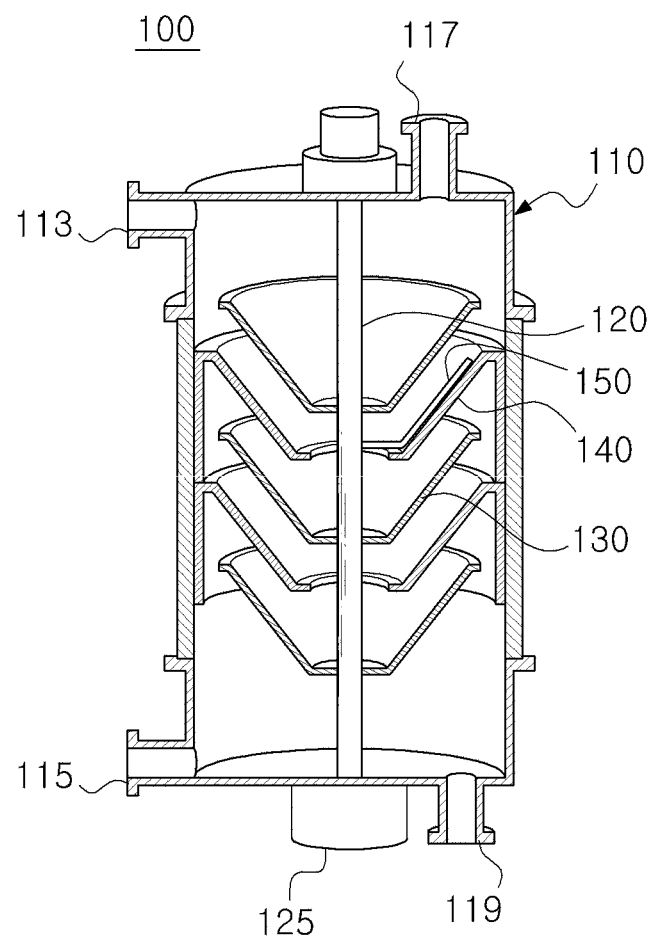
Figure 5:
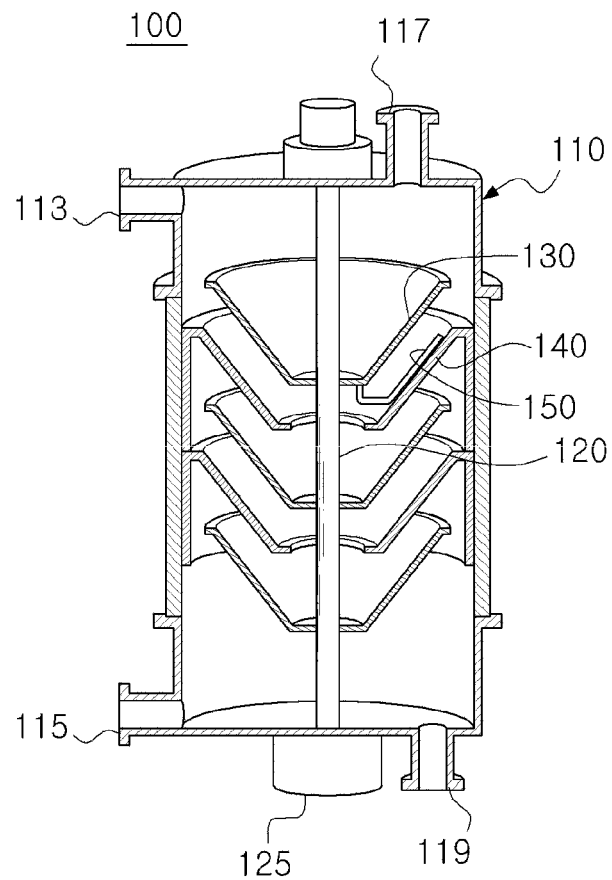

On the other hand, referring to FIGS. 2 and 5, the scraper 150 may extend to face the inner circumferential surface of the fixed cone 140 in order to remove scale generated in the inner circumferential surface of the fixed cone 140.

Meanwhile, referring to FIGS. 1 to 3, the scraper 150 may extend from the rotating shaft 120. On the other hand, referring to FIGS. 4 and 5, the scraper 150 may extend from the rotating cone 130.

Referring to FIG. 6, the scraper 150 may extend parallel to a first imaginary line segment α which is parallel to the rotating shaft 120 connecting an upper end portion of the fixed cone 140 to a lower end portion of the fixed cone 140 at the shortest length. Specifically, the scraper 150 may extend so that at least a portion of the scraper 150 may be parallel to the rotating shaft 120.

On the other hand, referring to FIG. 7, the scraper 150 may extend at a predetermined angle with respect to the first line segment α. Specifically, the scraper 150 may extend so that at least a portion of the scraper 150 may be inclined at a predetermined angle with respect to the rotating shaft 120.

Meanwhile, as shown in FIG. 6, when the scraper 150 extends parallel to the first line segment α, the scraper 150 may be formed at a relatively short length. Therefore, it may be easy to design the scraper 150.

On the other hand, as shown in FIG. 7, when the scraper 150 extends obliquely with respect to the first line segment α, a contact area between the scraper 150 and the fixed cone 140 may increase, thereby removing the scale more effectively.

In addition, the number of the scraper 150 in the drawings is one, but the present invention is not limited thereto. For example, the plurality of scrapers 150 may also be provided.

Referring to FIG. 8, the drive unit 125 may be driven to rotate the rotating cone 130 and supply a reactant A to the housing 110 via the first supply unit 113. Also, a gas B may be supplied to the housing 110 via the second supply unit 115. In this case, the reactant A is not particularly limited as long as the reactant A is a polymer including a volatile monomer. For example, the reactant A may be one selected from the group consisting of PVC, SBR, NBR, ABS, and PBL latex. Also, the gas B may be high-temperature steam capable of applying heat to the reactant.

Referring to FIG. 9, the reactant A supplied into the housing 110 is transferred to the rotating cone 130, and then moves toward the upper end of the rotating cone 130 by means of a centrifugal force. After that, the reactant is separated from the rotating cone 130, and transferred to the fixed cone 140. The reactant transferred to the fixed cone 140 moves toward the lower end of the fixed cone 140 along the slope of the fixed cone 140, and is then separated from the fixed cone 140, and transferred to the rotating cone 130 again.

Meanwhile, the gas B supplied into the housing 110 reacts with the reactant while moving the housing 110 upward. In this case, since the reactant thinly spreads by means of the centrifugal force of the rotating cone 130, the reactant may react with the gas over a large area. When the reactant reacts with the gas as described above, a volatile organic compound is removed from the reactant, and a residual gas including the volatile organic compound and the gas is discharged through the outlet unit 117 (C).

Also, the reactant (i.e., a product) from which the volatile organic compound is removed is collected into the collection unit 119 (D). Then, the scraper 150 rotates with the rotating shaft 120 or the rotating cone 130. In this case, the scraper 150 is disposed to face the fixed cone 140. Referring to FIG. 9, the scraper 150 may periodically remove the scale generated in the fixed cone 140.

Figure 14:
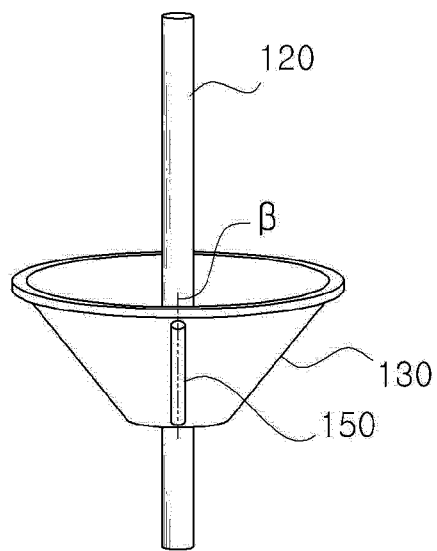
FIGS. 14 and 15 are partial perspective views showing a scraper and a rotating cone which constitute the apparatus for separating gas and liquid according to the second exemplary embodiment of the present invention.
Figure 15:
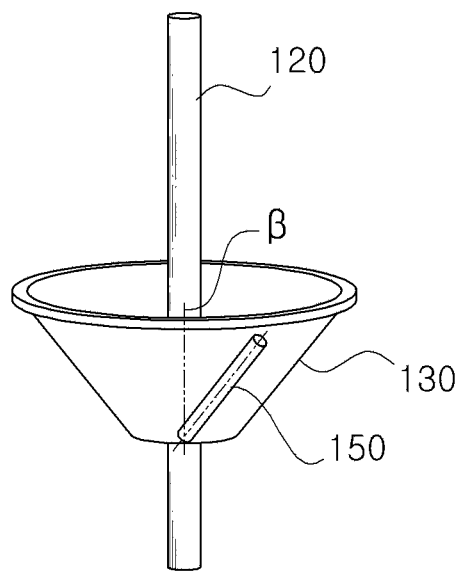

Meanwhile, to effectively perform a reaction between the reactant and the gas, an inner pressure of the housing 110 may be reduced or enhanced. FIGS. 10 to 13 are cross-sectional views of an apparatus for separating gas and liquid according to a second exemplary embodiment of the present invention, and FIGS. 14 and 15 are partial perspective views showing a scraper and a rotating cone which constitute the apparatus for separating gas and liquid according to the second exemplary embodiment of the present invention.

Referring to FIGS. 10 to 13, the apparatus for separating gas and liquid 200 according to the second exemplary embodiment of the present invention is different from the above-described apparatus for separating gas and liquid 100 according to the first exemplary embodiment of the present invention in view of the position of the scraper 150 and a subject from which scale is removed.

Therefore, a description of the apparatus for separating gas and liquid 200 according to the second exemplary embodiment which is related to the same configuration as the apparatus for separating gas and liquid 100 according to the first exemplary embodiment may be omitted for clarity, and thus the apparatus for separating gas and liquid 200 according to the second exemplary embodiment will be described focusing on the scraper 150.

The scraper 150 constituting the apparatus for separating gas and liquid 200 according to the second exemplary embodiment serves to remove scale generated in the rotating cone 130. Also, in this specification, the scraper 150 configured to remove scale generated in the fixed cone 140 may be referred to as a second scraper.

Here, the scraper 150 may be a bar-shaped scraper extending in a rod shape from the housing 110 or the fixed cone 140. In this case, since the scraper 150 extends from the housing 110 or the fixed cone 140, the scraper 150 is maintained in a fixed posture regardless of the rotation of the rotating shaft 120. Therefore, when the rotating cone 130 rotates, relative rotational displacement occurs on the fixed scraper 150 with respect to the rotating cone 130. As a result, the scraper 150 may periodically remove the scale generated in the rotating cone 130.

Specifically, the scraper 150 may come in contact with the rotating cone 130 to remove the scale generated in the rotating cone 130. On the other hand, referring to FIG. 10, the scraper 150 may be spaced apart at a predetermined distance D from the rotating cone 130 in order to prevent friction between the scraper 150 and the rotating cone 130. In this case, when the scale is generated in the rotating cone 130 to a certain thickness or higher, the scale may be removed by the scraper 150.

Also, the scraper 150 extends from an inner circumferential surface of the housing 110 or the fixed cone 140 toward the rotating cone 130. Here, the scraper 150 may be spaced apart at a predetermined distance D from the rotating cone 130, based on the thickness of scale to be generated in the rotating cone 130. Specifically, a fixed end of the scraper 150 is coupled to the housing 110 or the fixed cone 140, and a free end of the scraper 150 extends from the fixed end toward the rotating cone 130. Also, the free end of the scraper 150 may be spaced apart at a predetermined distance D from the rotating cone 130.

In addition, when bubbles are formed on the rotating cone 130, the scraper 150 may burst the bubbles to prevent or inhibit growth of the scale. Meanwhile, the position of the scraper 150 is not particularly limited as long as the scraper 150 may remove the scale generated in the rotating cone 130.

Figure 10:
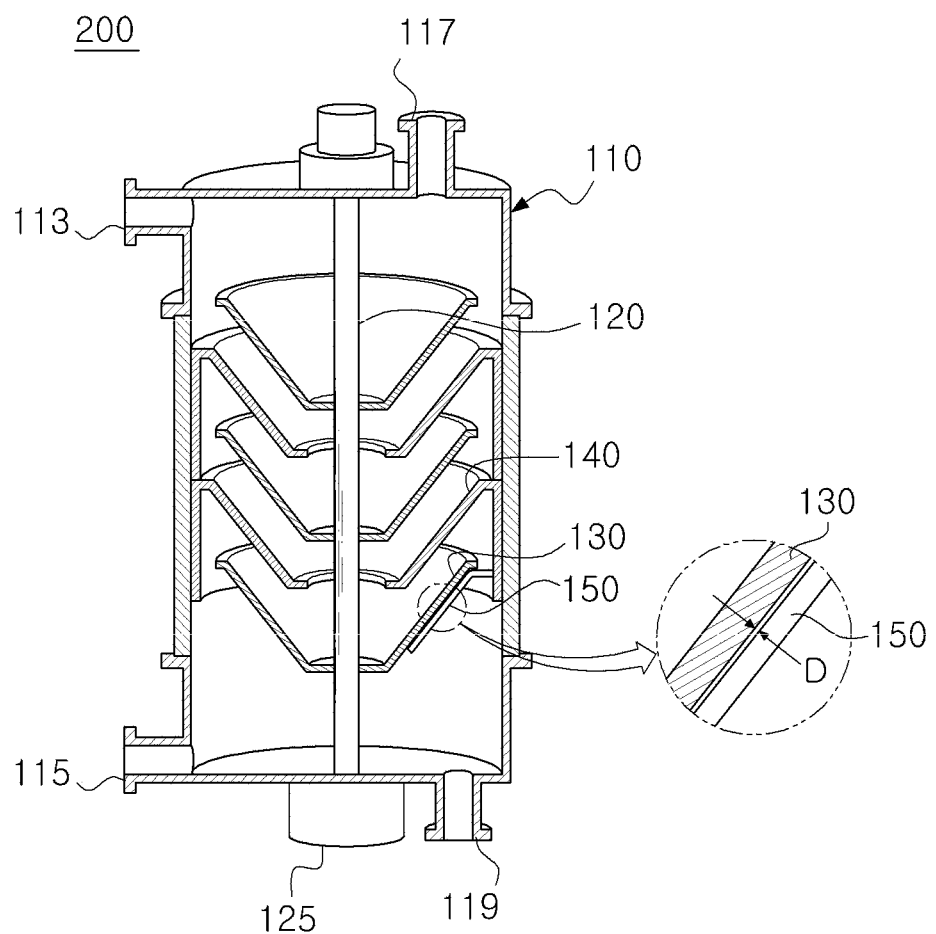
FIGS. 10 to 13 are cross-sectional views of an apparatus for separating gas and liquid according to a second exemplary embodiment of the present invention.
Figure 12:
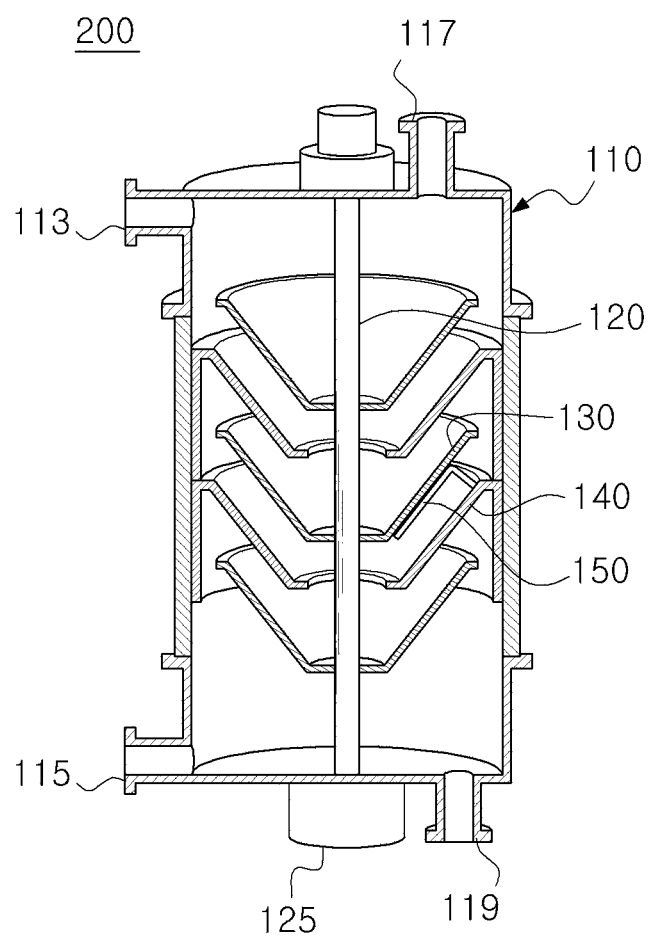

Referring to FIGS. 10 and 12, however, the scraper 150 may extend to face an outer circumferential surface of the rotating cone 130 in order to remove scale generated in the outer circumferential surface of the rotating cone 130.

Figure 11:
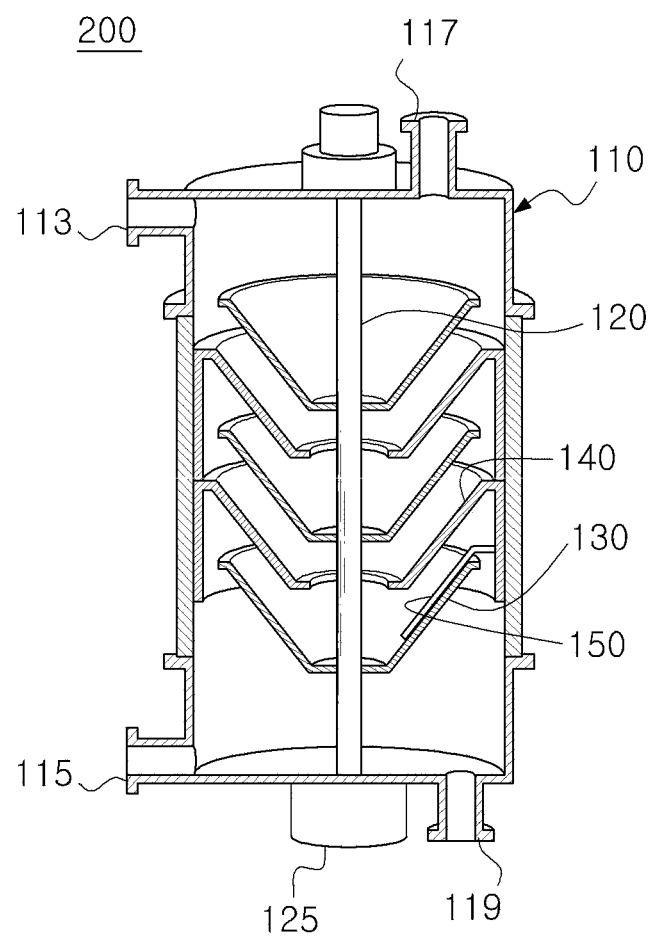
Figure 13:
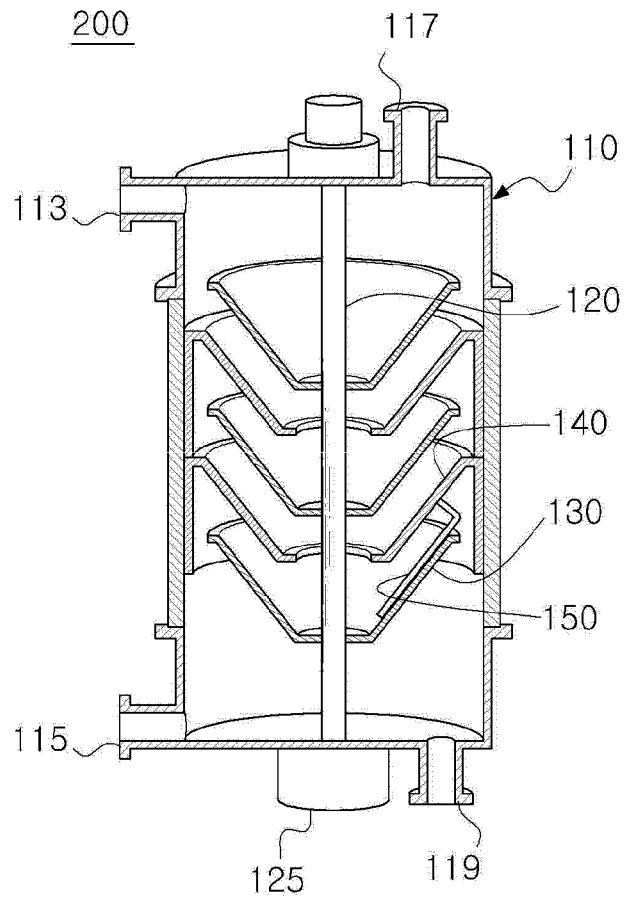

Referring to FIGS. 11 and 13, the scraper 150 may also extend to face an inner circumferential surface of the rotating cone 130 in order to remove scale generated in the inner circumferential surface of the rotating cone 130.

Meanwhile, referring to FIGS. 10 and 11, the scraper 150 may extend from the housing 110. On the other hand, referring to FIGS. 12 and 13, the scraper 150 may extend from the fixed cone 140.

Meanwhile, referring to FIG. 14, the scraper 150 may extend parallel to a second imaginary line segment $\beta$ which is parallel to the rotating shaft 120 connecting an upper end portion of the rotating cone 130 to a lower end portion of the rotating cone 130 at the shortest length. Also, the scraper 150 may extend so that at least a portion of the scraper 150 may be parallel to the rotating shaft 120.

Referring to FIG. 15, the scraper 150 may also extend at a predetermined angle with respect to the second line segment $\beta$. Also, the scraper 150 may extend so that at least a portion of the scraper 150 may be inclined at a predetermined angle with respect to the rotating shaft 120.

As shown in FIG. 14, when the scraper 150 extends parallel to the second line segment $\beta$, the scraper 150 may be formed at a relatively short length. Therefore, it may be easy to design the scraper 150.

On the other hand, as shown in FIG. 15, when the scraper 150 extends obliquely with respect to the second line segment β, a contact area between the scraper 150 and the rotating cone 130 may increase, thereby removing the scale more effectively.

Additionally, the number of the scraper 150 in the drawings is one, but the present invention is not limited thereto. For example, the plurality of scrapers 150 may also be provided.

As described above, the apparatuses for separating gas and liquid 100 and 200 according to the exemplary embodiments of the present invention may be gas/liquid reactors used to remove volatile organic compounds from the reactant by reaction between the reactant and the gas.

However, the reactant may not necessarily and chemically react with the gas. For example, the apparatuses for separating gas and liquid 100 and 200 according to the exemplary embodiments of the present invention may be used to separate a material through the contact with the gas. Specifically, the apparatus for separating gas and liquids 100 and 200 according to the exemplary embodiments of the present invention may be used to separate a material (for example, a volatile substance, etc.) included in a liquid-phase mixture by bringing the liquid-phase mixture into contact with a gas (especially a high-temperature gas).

However, the mixture is not particularly limited as long as it is a binary component mixture in which a gas-phase material is dissolved in a liquid-phase material. For example, the mixture may be a ternary component mixture further including a solid-phase material. That is, the apparatuses for separating gas and liquid 100 and 200 according to the exemplary embodiments of the present invention may be used to separate the ternary component material as well as the binary component material.

Up to now, the apparatus for separating gas and liquid 100 according to the first exemplary embodiment including the first scraper and the apparatus for separating gas and liquid 200 according to the second exemplary embodiment including the second scraper have been described separately.

Each of the apparatuses for separating gas and liquid according to other exemplary embodiments of the present invention may include both of a first scraper configured to remove scale generated in the fixed cone, based on the rotation of the rotating shaft, and a second scraper configured to remove scale generated in the rotating cone, based on the rotation of the rotating shaft.

The present invention has been described in detail. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF MAIN PARTS IN THE DRAWINGS

| 100, 200: apparatus for separating gas and liquid | 110: housing |
|---|---|
| 113: first supply unit | 115: second supply unit |
| 117: outlet unit | 119: collection unit |
| 120: rotating shaft | 25: drive unit |
| 130: rotating cone | 40: fixed cone |
| 150: scraper | α: first line segment |
| β: second line segment | |

The invention claimed is:

1. An apparatus for separating gas and liquid comprising:
a housing;
a rotating shaft provided inside the housing;
a drive unit configured to rotate the rotating shaft;
a rotating cone mounted at the rotating shaft to rotate about the rotating shaft and having a diameter decreasing from an upper end to a lower end thereof;
a fixed cone fixed in the housing to be spaced apart from the rotating cone and having a diameter decreasing from an upper end to a lower end thereof; and
a scraper configured to remove a scale generated in the fixed cone, based on the rotation of the rotating shaft,
wherein the scraper is fixed in the rotating shaft or the rotating cone, and configured to remove the scale generated in the fixed cone while rotating with the rotating shaft or the rotating cone,
wherein the scraper extends from the rotating shaft or the rotating cone toward the fixed cone,
wherein the scraper is in direct contact with the fixed cone to remove the scale generated in the fixed cone, and
wherein the scraper remains in contact with the fixed cone while rotating with the rotating shaft.

2. The apparatus for separating gas and liquid of claim 1, wherein the scraper extends to face an outer circumferential surface of the fixed cone.

3. The apparatus for separating gas and liquid of claim 1, wherein the scraper extends to face an inner circumferential surface of the fixed cone.

4. The apparatus for separating gas and liquid of claim 1, wherein the scraper extends parallel to the rotating shaft.

5. The apparatus for separating gas and liquid of claim 1, wherein the scraper extends at a predetermined angle with respect to the rotating shaft.

6. An apparatus for separating gas and liquid comprising:
a housing;
a rotating shaft provided inside the housing;
a drive unit configured to rotate the rotating shaft;
a rotating cone mounted at the rotating shaft to rotate about the rotating shaft and having a diameter decreasing from an upper end to a lower end thereof;
a fixed cone fixed in the housing to be spaced apart from the rotating cone and having a diameter decreasing from an upper end to a lower end thereof; and
a scraper configured to remove a scale generated in the rotating cone, based on the rotation of the rotating shaft,
wherein the scraper is fixed in the fixed cone, and configured to remove the scale generated in the rotating cone while the rotating cone is rotated,
wherein the scraper extends from the fixed cone toward the rotating cone,
wherein the scraper is in direct contact with the rotating cone to remove the scale generated in the rotating cone, and
wherein the scraper remains in contact with the rotating cone while rotating with the rotating shaft.

7. The apparatus for separating gas and liquid of claim 6, wherein the scraper extends to face an outer circumferential surface of the rotating cone.

8. The apparatus for separating gas and liquid of claim 6, wherein the scraper extends to face an inner circumferential surface of the rotating cone.

9. The apparatus for separating gas and liquid of claim 6, wherein the scraper extends parallel to the rotating shaft.

10. The apparatus for separating gas and liquid of claim 6, wherein the scraper extends at a predetermined angle with respect to the rotating shaft.

11. An apparatus for separating gas and liquid comprising:
a housing;
a rotating shaft provided inside the housing;
a drive unit configured to rotate the rotating shaft;
a rotating cone mounted at the rotating shaft to rotate about the rotating shaft and having diameter decreasing from an upper end to a lower end thereof;
a fixed cone fixed in the housing to be spaced apart from the rotating cone and having a diameter decreasing from an upper end to a lower end thereof;
a first scraper configured to remove a scale generated in the fixed cone, based on the rotation of the rotating shaft; and
a second scraper configured to remove scale generated in the rotating cone, based on the rotation of the rotating shaft,
wherein the first scraper is fixed in the rotating shaft or the rotating cone, and configured to remove the scale generated in the fixed cone while rotating with the rotating shaft or the rotating cone,
wherein the first scraper extends from the rotating shaft or the rotating cone toward the fixed cone,
wherein the first scraper is in direct contact with the fixed cone to remove the scale generated in the fixed cone, and
wherein the first scraper remains in contact with the fixed cone while rotating with the rotating shaft.

12. The apparatus for separating gas and liquid of claim 11, wherein the second scraper is fixed in the housing or the fixed cone, and configured to remove scale generated in the rotating cone while the rotating shaft is rotated.

13. The apparatus for separating gas and liquid of claim 11, wherein the second scraper extends from the housing or the fixed cone toward the rotating cone, and
the second scraper is spaced apart at a predetermined distance from the rotating cone, based on the thickness of scale to be formed in the rotating cone.

* * * * *